United States Patent [19]

Raszewski

[11] Patent Number: 4,698,254

[45] Date of Patent: Oct. 6, 1987

[54] PACKAGING LAMINATE

[75] Inventor: Lewis R. Raszewski, Stevensville, Md.

[73] Assignee: The Crowell Corporation, Newport, Del.

[21] Appl. No.: 940,566

[22] Filed: Dec. 12, 1986

Related U.S. Application Data

[63] Continuation-in-part of Ser. No. 873,819, Jun. 13, 1986, Continuation-in-part of Ser. No. 783,430, Oct. 4, 1985.

[51] Int. Cl.⁴ .................. B32B 7/00; B32B 15/08; B32B 15/18; B32B 15/20
[52] U.S. Cl. .................. 428/215; 428/315.5; 428/317.1; 428/319.1; 428/458
[58] Field of Search .................. 428/215, 315.5, 315.7, 428/315.9, 317.1, 317.5, 317.7, 319.1, 458

[56] References Cited

U.S. PATENT DOCUMENTS

| | | | |
|---|---|---|---|
| 4,086,384 | 4/1978 | Adelman et al. | 428/315.5 |
| 4,263,360 | 4/1981 | Adelman | 428/315.9 |
| 4,321,297 | 3/1982 | Adelman | 428/315.9 |
| 4,360,984 | 11/1982 | Ruttenburg | 428/319.1 |
| 4,584,225 | 4/1986 | Adelman | 428/315.7 |

FOREIGN PATENT DOCUMENTS

| | | | |
|---|---|---|---|
| 45-25398 | 8/1970 | Japan | 428/319.1 |
| WO85/04150 | 9/1985 | World Int. Prop. O. | 53/450 |

Primary Examiner—William J. Van Balen
Attorney, Agent, or Firm—Connolly & Hutz

[57] ABSTRACT

Packaging with a laminate of cushiony foam adhered to polyethylene terephthalate backing sheet which is metallized on both faces, or adhered to iron foil or to a sandwich of iron foils separated from each other by non-magnetic layer. Laminates can be formed into envelope. Exposed face of foam layer can carry antistat to keep static electricity from building up when article to be packaged is slid over that face.

8 Claims, 2 Drawing Figures

U.S. Patent    Oct. 6, 1987    4,698,254

PACKAGING LAMINATE

The present application is in part a continuation of applications Ser. No. 873,819 filed June 13, 1986 and Ser. No. 783,430 filed Oct. 4, 1985.

The present invention relates to packaging techniques for articles that need protection against handling damage, as well as against damage from electrical or other influences.

Among the objects of the present invention is the provision of novel and highly effective packaging material.

Additional objects of the present invention include novel techniques for protectively packaging sensitive articles.

Figure 1:
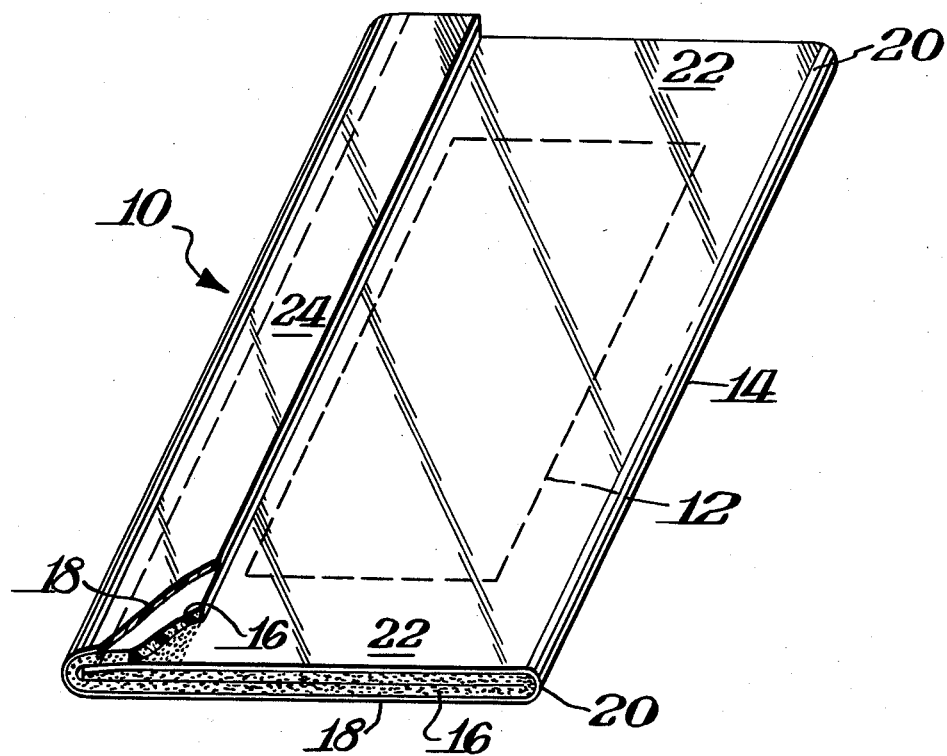
Figure 2:
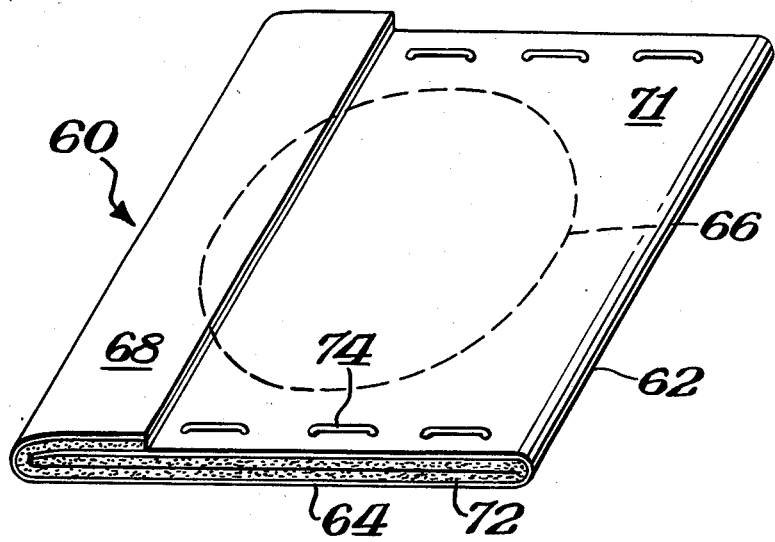

The foregoing, as well as still further objects of the present invention, will be more fully understood from the following description of several of its exemplifications, reference being made to the accompanying drawings in which FIG. 1 is an isometric view of a packaging envelope holding an electrically sensitive object pursuant to the present invention, a portion of the envelope being broken away to show its construction; and FIG. 2 is a similar view of a modified packaging according to the present invention.

A feature of the present invention is a packaging laminate having a layer of cushiony foam about 1 to about 7 millimeters thick, laminated to a metallized polyethylene terephthalate backing sheet not over about 25 microns thick, the backing sheet being metallized on both its faces to shield against external electrical influences, and the unlaminated face of the foam carrying a quantity of anti-stat sufficient to prevent the build-up of a damaging amount of static electricity when an object is slid over that face.

The laminant used in adhere the foam to the polyethylene terephthalate is preferably a pressure-sensitive adhesive, particularly where the laminate is to be heat sealed to itself or to other objects. Typical pressure-sensitive adhesives are described in Application Ser. No. 768,103 filed Aug. 21, 1985, the contents of which are hereby incorporated herein as though fully set out.

Turning now to the drawings, FIG. 1 shows a package 10 in which an electrically sensitive object 12 such as a circuit board is held in an envelope 14 made of a layer 16 of cushiony foam laminated to a polyethylene terephthalate sheet 18 that is metallized on both its faces. The metallizing is preferably about the same on both faces; together they are heavy enough to make the polyethylene terephthalate sheet quite opaque even when that sheet is quite transparent before metallizing.

The thickness of that sheet should be not over about 25 microns, and preferably about 15 to about 20 microns. The two metallizing layers, generally aluminum, provide particularly effective dual shielding of the package contents against external electrical influences.

The cushiony foam layer can be the microcellular closed-cell polypropylene foam described in U.S. Pat. Nos. 4,086,384 and 4,263,380, but any other cushiony foam of polyethylene, polystyrene, polyvinyl chloride or polyurethane can be used. The thickness of the foam layer is preferably from about 1 to about 7 millimeters, and only 3 millimeters or less are enough for securely packaging light weight objects such as computer discs of the floppy or rigid types.

The outer face of the foam, which is the face not laminated to the polyethylene terephthalate sheet, preferably carries sufficient antistat to keep from developing a serious static charge build-up when anyting is slid over that surface. Any of the antistat agents disclosed in parent Application Ser. No. 873,819 or in U.S. Pat. Nos. 4,321,297 and 4,584,225 can be used as long as they provide the short static discharge time allowed in the industry, generally about 0.4 second.

The envelope 14 is preferably made by folding a sheet of the laminate along the line 20—20, and adhering the side edges 22, 22 of one fold to the corresponding side edges of the other fold. Such adherence can be effected by heat sealing or cold sealing, along the lines described in parent Ser. Nos. 873,819 and 783,430, or by ultrasonic bonding as also disclosed in Ser. No. 783,430. Substituting ultrasonic vibrators and anvils, for some or all of the melting shoes and supports in the sealing apparatus of Ser. No. 873,819, is particularly desirable.

The folds of the FIG. 1 envelope can alternatively be secured together with ordinary cements or even by stapling. The continuity of the metallized layers from one fold to the other improves their Faraday cage effect in electrically protecting the objects packaged.

Envelope 14 also has a closure flap 24 which spans the free ends of its folds and thus adds further to the electrical protection. For best protection that flap can be sealed against the fold it overlies, in any of the various ways described for the side-edge sealing, including heat sealing with heated applications or ultrasonic heating, cold sealing with cohesive-nonadhesive cement or pressure-sensitive cement coatings on the underside of the flap, as well as on the fold against which it lies, or even stapling.

Packaging can also be effected by using separate sheets of laminate 14 sandwiched over the top and bottom of the packaged object 12, as described in the parent applications. Those separate laminate sheets can be heat sealed, cold sealed or stapled together around the packaged object.

The highly specular nature of the outer metallized surface of the polyethylene terephthalate laminations can be subdued by graining that surface preferably before it is metallized. A mild sandblasting with very fine sharp sand is quite effective, as is the casting of the polyethylene terephthalate sheet against a grained mold surface or the rolling of that sheet between rollers, at least one of which is grained. Such graining of the polyethylene terephthalate sheet helps mask the fingerprints which are normally picked up upon handling the laminate.

The package 60 of FIG. 2 has an envelope 62 generally similar in shape and construction to the envelope 14 of FIG. 1. Instead of the polyethylene terephthalate backing sheet of FIG. 1, envelope 62 has an iron foil backing sheet 64. That foil is preferably a fairly pure essentially carbon-free annealed iron which has a very high magnetic permeability and a very low remanence. A one-to-three mil thick foil of this type provides good magnetic shielding for the contents of envelope 62, such as a magnetic recording disc 66. A similar foil of iron which contains 1% to 3% silicon is also quite effective.

Metal foil 64 provides sufficient rigidity to stiffen the entire envelope and also enable its flap 68 to remain in place without cementing. Envelope 62 can accordingly be used both for shipping its contents, as well as for storing those contents between times when they are intermittently withdrawn for use in a computer or the like. The flap is readily folded open for such withdrawal and re-insertion.

The iron foil can have its external face treated to inhibit corrosion. It can, for example, be coated with aluminum, silver or copper, which provide highly conductive skins that help protect against external electrical influences, or merely coated with a corrosion inhibitor such as partially reduced zincdichromate. The foam layer can also carry volatile corrosion inhibitor that helps protect the foil, particularly its foam-contacting face.

Any metal having a magnetic permeability and remanence approximating those of pure iron provides effective magnetic shielding for the contents of envelope 62.

Envelope 62 can be formed in other ways, as for example, by having its upper fold 71 wider than its lower fold 72 and projecting beyond both side edges of the lower fold. Those projecting margins can then be folded about the edges of the lower fold, and engaged against the lower surface of the lower fold 72. Where those folded-over margins are sufficiently stiff, they need not be adhered to the lower surface of fold 72. Alternatively, they can be adhered to that lower surface as by staples 74 as in FIG. 2, or by adhesives, or by having the extending margins of upper fold 71 free of foam so that those margins can be soldered to the lower surface of fold 72. Where staples are used as in FIG. 2, they are preferably also of pure iron so they magnetically interconnect the foil of the folds at their edges. Adhesives or heat-sealing can also be used and heat sealing can be arranged to melt most or all of the foam in the heat-sealing zone to thus shorten the air gap at the fold edges.

A flap 68 is not needed on the envelope 62 of FIG. 2, particularly if it is only proposed to hold a thin magnetic disc.

The magnetic protection of FIG. 2 is further improved by dividing the foil 64 into two layers that are separated by a non-magnetic gap. Thus, two layers of 0.5-to-1 mil thick iron foil coated on one face with about a 10-micron thick layer of polyethylene or polystyrene or the like can be laminated together with one of the thin coatings between the foils and the resulting assembly laminated to the foam layer. The foam can be cemented to the uncoated face of one of the iron foils so that the outer face of the outer foil carries the thin coating as a rust-preventative or the like.

Obviously, many modifications and variations of the present invention are possible in the light of the above teachings. It is, therefore, to be understood that within the scope of the appended claims the invention may be practiced otherwise than as specifically described.

I claim:

1. A packaging laminate having a layer of cushiony foam about 1 to about 7 millimeters thick laminated to a metallized polyethylene terephthalate backing sheet not over about 25 microns thick, the backing sheet being metallized on both its faces to shield against external electrical influences, and the unlaminated face of the foam carrying a quantity of antistat sufficient to prevent the build-up of a damaging amount of static electricity when an object is slid over that face.

2. The combination of claim 1 in which the backing sheet is 15-to-20 microns thick.

3. The combination of claim 1 in which the lamination of the foam to the backing sheet is with a pressure-sensitive laminant.

4. The combination of claim 1 in which the outer face of the backing sheet is grained to reduce the specularity of its metallized coating.

5. The laminate of claim 1 in the form of a packaging envelope.

6. A solid state electronic circuit board packaged in the envelope of claim 5.

7. A packaging laminate having a layer of cushiony foam about 1 to about 7 millimeters thick laminated to foil at least about 0.5 mil thick of a metal having a magnetic permeability and remanence approximating those of pure iron.

8. The laminate of claim 7 in which the foil is divided into two layers each ½ to 1 mil thick separated by a non-magnetic gap.

* * * * *